US008473363B1

(12) United States Patent
Oakes, III

(10) Patent No.: US 8,473,363 B1
(45) Date of Patent: Jun. 25, 2013

(54) SYSTEMS AND METHODS FOR PRICE SEARCHING AND CUSTOMER SELF-CHECKOUT USING A MOBILE DEVICE

(75) Inventor: Charles Lee Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/335,379

(22) Filed: Dec. 22, 2011

Related U.S. Application Data

(63) Continuation of application No. 12/042,668, filed on Mar. 5, 2008, now Pat. No. 8,086,497.

(51) Int. Cl.
*G06Q 30/00* (2012.01)
(52) U.S. Cl.
USPC ........................................................ 705/26.1
(58) Field of Classification Search
USPC ........................................................ 705/26.1
See application file for complete search history.

(56) References Cited

U.S. PATENT DOCUMENTS

| 7,245,221 | B2 | 7/2007 | Claudatos et al. | |
|---|---|---|---|---|
| 2002/0074398 | A1 | 6/2002 | Lancos et al. | |
| 2004/0064377 | A1 | 4/2004 | Ergo et al. | |
| 2005/0096989 | A1 | 5/2005 | Ostlund | |
| 2007/0050275 | A1 | 3/2007 | Hunsicker | |
| 2007/0073585 | A1* | 3/2007 | Apple et al. | 705/14 |
| 2007/0094087 | A1* | 4/2007 | Mitchell et al. | 705/22 |
| 2007/0136140 | A1 | 6/2007 | Smith, Jr. | |
| 2007/0150369 | A1 | 6/2007 | Zivin | |
| 2007/0290037 | A1* | 12/2007 | Arellanes et al. | 235/383 |
| 2007/0299736 | A1 | 12/2007 | Perrochon et al. | |
| 2009/0012897 | A1* | 1/2009 | Flitcroft et al. | 705/43 |
| 2011/0191209 | A1* | 8/2011 | Gould et al. | 705/26.82 |
| 2012/0270560 | A1* | 10/2012 | Moshir et al. | 455/456.1 |

OTHER PUBLICATIONS

Ryan Ellis; Credit card companies will refund cardholders' losses; Leader Post. Regina, Sask.: Mar. 12, 2005. p. 5; http://proquest.umi.com/pqdweb?did=807096471&sid=4&Fmt=3&clientId=19649 &RQT=309&VName=PQD.*

Barcode-Tech Data Collectors, "Portable Data Terminals & Data Collection Equipment," Retrieved from the internet <URL: http://www.barcode-tech.com/portdata.html>, Copyright 1999-2007 Barcode-Tech.com. 1 pg.

Bradley Stertz, St. Petersburg Times, St. Petersburg, Fla, Apr. 8, 1987, p. 15 A http://proquest.umi.com/pgdweb?did=49966657&sid=3 &Fmt=3&clientId-1964&RQT=309&VName=PQD. 2 pgs.

Mobile Assets, "Mobile Assets Code Reader, MOBI Barcode Overview," Retrieved from the internet <URL: http://www.mobileassetscorp.com/bar_code.html>, Copyright 2006, Mobile Assets Corp. pp. 1-2.

(Continued)

*Primary Examiner* — Mila Airapetian
(74) *Attorney, Agent, or Firm* — Brooks, Cameron & Huebsch, PLLC

(57) ABSTRACT

Price searching and customer self-checkout on a mobile device is provided. A system for purchasing products comprises at least one subsystem that receives from a mobile device at least price and seller identification data of a product, (at least the price of said product having been electronically read by the mobile device), and at least one subsystem that charges a user for the product based upon the received price and identification data.

18 Claims, 10 Drawing Sheets

OTHER PUBLICATIONS

Slashphone.Com "Taiwan Launches Mobile Bar Code (QR Code)," Retrieved from the internet <URL: http://www.slashphone.com/64/3500.html>, pp. 1-4.

The KAYWA Reader, "Mobile With KAYWA Reader," Retrieved from the internet <URL: http://reader.kaywa.com/>, p. 1 of 1.

* cited by examiner

SYSTEMS AND METHODS FOR PRICE SEARCHING AND CUSTOMER SELF-CHECKOUT USING A MOBILE DEVICE

CROSS REFERENCE TO RELATED APPLICATIONS

The present patent application is a continuation of U.S. patent application Ser. No. 12/042,668, filed Mar. 5, 2008, and is related in subject matter in the following commonly assigned application Ser. No. 12,042,653, filed Mar. 5, 2008, now U.S. Pat. No. 7,593,873; and Ser. No. 12/042,665, filed Mar. 5, 2008, now U.S. Pat. No. 7,680,702.

BACKGROUND

Long checkout lines have always been a problem for both customers and retailers on busy shopping days. Stores would like to provide better customer service for their patrons and customers value their time and may avoid shopping during busy periods or may have to limit their time shopping due to the delays. This also results in reduced revenues for the retail establishments. Currently, there are in place systems for self-checkout in many establishments, but these systems are often cumbersome for the customer and are usually slower on a per transaction basis than traditional check-out lines with an experienced cashier. In these systems, the customer must still take all their items and scan them individually at the checkout stand, and also make the payment transaction at the checkout stand. This often causes a backup at the checkout while people wait to scan and pay for their items, and thus may cause long lines to form resulting in needless delay.

In this regard, there is a need for price searching and customer self-checkout on a mobile device that provides more efficient way for customers to purchase products.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, price searching and customer self-checkout on a mobile device is provided. For several embodiments, a system for purchasing products comprises at least one subsystem that receives from a mobile device at least price and seller identification data of a product, (at least the price of said product having been electronically read by the mobile device), and at least one subsystem that charges a user for the product based upon the received price and identification data.

Other advantages and features of the invention are described below.

BRIEF DESCRIPTION OF THE DRAWINGS

Price searching and customer self-checkout on a mobile device is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
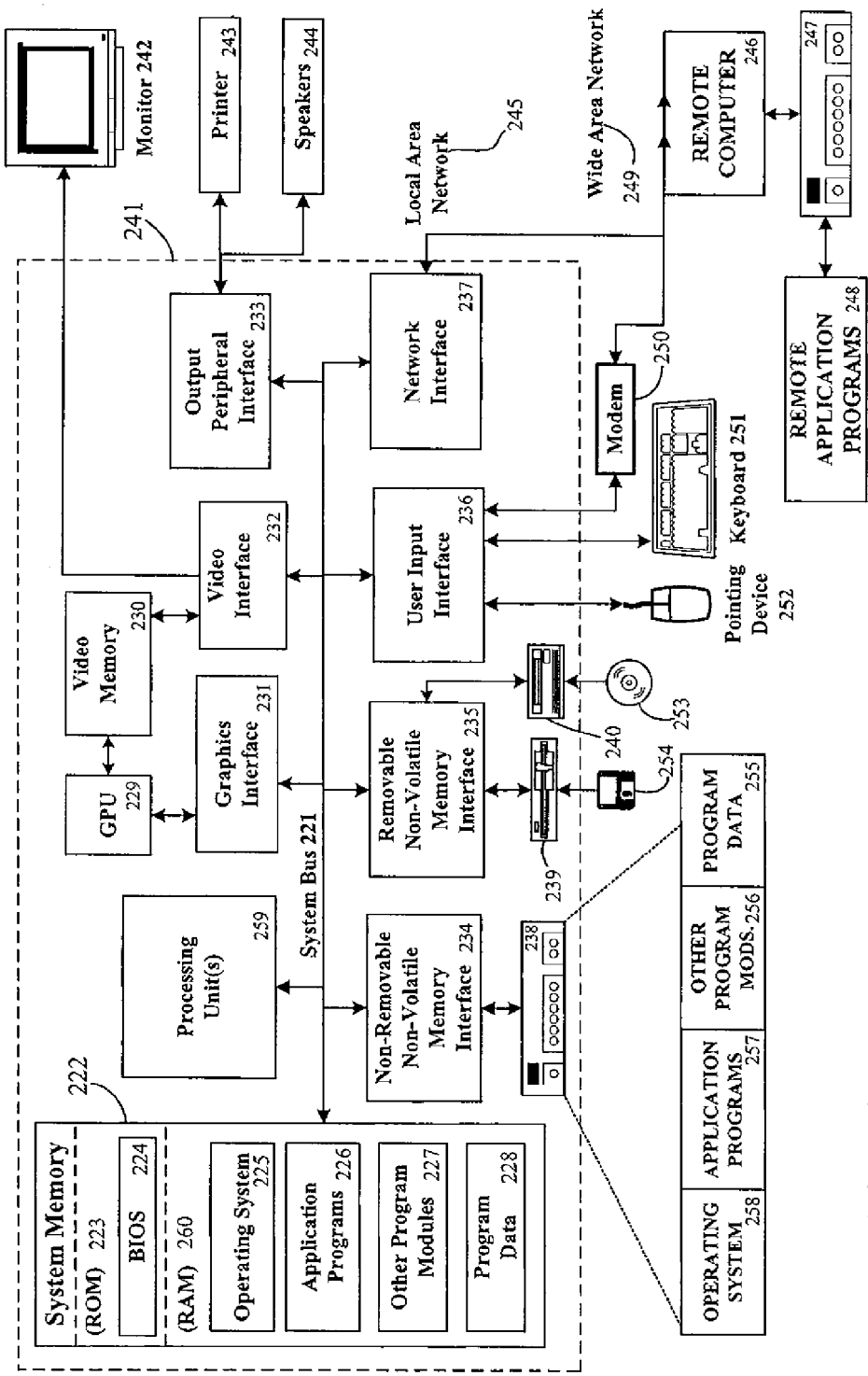
FIG. 1 is a block diagram representing an exemplary computing device suitable for use in conjunction with implementing price searching and customer self-checkout on a mobile device.

Referring next to FIG. 1, shown is a block diagram representing an exemplary computing device suitable for use in conjunction with implementing the processes described above. For example, the computer executable instructions that carry out the processes and methods for price searching and customer self-checkout on a mobile device may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console or mobile computing device may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more standalone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
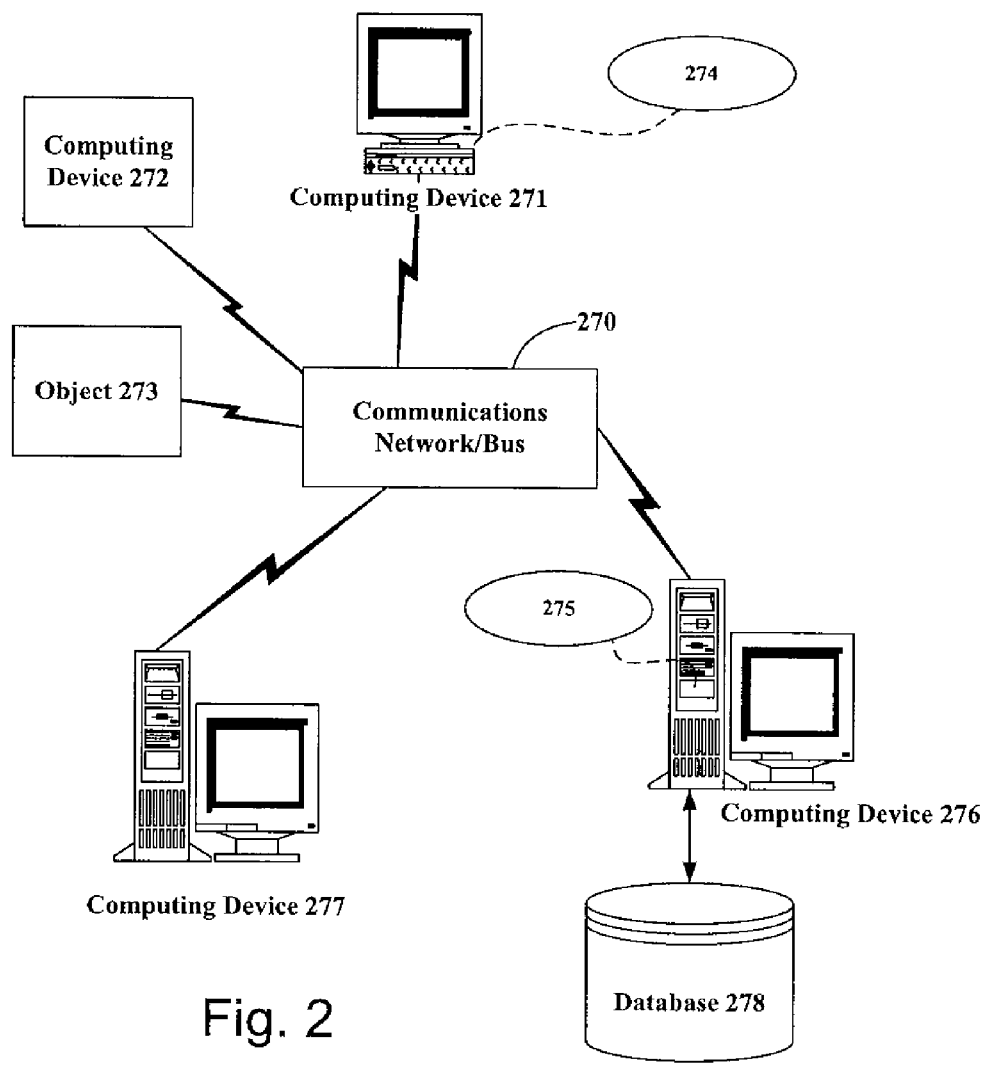
FIG. 2 illustrates an exemplary networked computing environment in which many computerized processes may be implemented to perform price searching and customer self-checkout on a mobile device.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing price searching and customer self-checkout on a mobile device. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the invention should not be limited to any single embodiment, but rather should be construed in breadth and scope in accordance with the appended claims.

Figure 3:
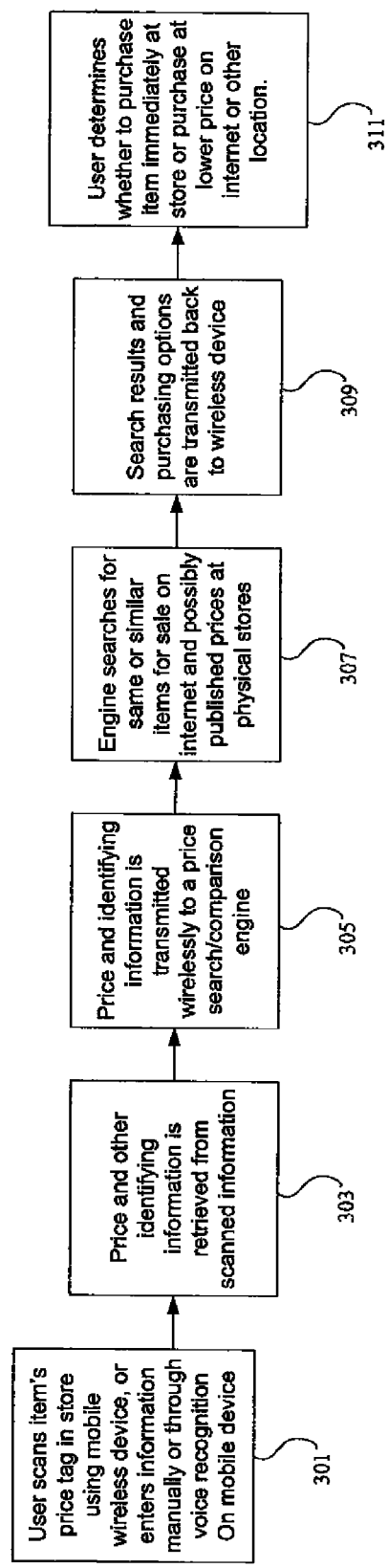
FIG. 3 is a flow chart illustrating an example process according to price searching on a mobile device.

Referring next to FIG. 3, shown is a flow chart illustrating an example process according to price searching and customer self-checkout on a mobile device. The user of a mobile device may scan 301 the tag attached to or associated with a product in a retail establishment. This may be accomplished in a variety of ways using any number of different scanning technologies currently known to those of ordinary skill in the such areas of technology. For example, the price tag of a product may include a barcode that may contain such information as price, serial number and other product identification information. A barcode is a machine-readable representation of information (usually dark ink on a light background to create high and low reflectance which is converted to 1s and 0s). Originally, barcodes stored data in the widths and spacings of printed parallel lines, but now they also come in patterns of dots, concentric circles, and text codes hidden within images. Barcodes can be read by optical scanners called barcode readers or scanned from an image by special software. Barcodes are widely used to implement Auto ID Data Capture (AIDC) systems that improve the speed and accuracy of computer data entry. An advantage over other methods of AIDC is that it is less expensive to implement. The best-known and most widespread use of barcodes has been on consumer products using the Universal Product Code (UPC) symbol.

Also, the user of a mobile device may scan 301 the tag attached to or associated with a product in a retail establishment using Radio-frequency identification (RFID) technologies. RFID is an automatic identification method, relying on storing and remotely retrieving data using devices called RFID tags or transponders. An RFID tag is an object that can be applied to or incorporated into a product, animal, or person for the purpose of identification using radio waves. Some tags can be read from several meters away and beyond the line of sight of the reader. Most RFID tags contain at least two parts. One is an integrated circuit for storing and processing information, modulating and demodulating a (RF) signal and can also be used for other specialized functions. The second is an antenna for receiving and transmitting the signal. A technology called chipless RFID allows for discrete identification of tags without an integrated circuit, thereby allowing tags to be printed directly onto assets at lower cost than traditional tags.

Once the price tag of the item is scanned 301, the price and other product identifying information is retrieved 303 from the scanned data by decoding functionality within the mobile device if need be. This price and other product identification information is then compared to price data resident on the mobile device itself and/or then transmitted 305 wirelessly, for example, to a product price search/comparison engine. The product price search/comparison engine then searches 307 for same or similar items for sale on the Internet in an automated fashion and possibly published prices at physical stores using the data transmitted from the mobile device. The search results and purchasing options are transmitted 309 back to the user's wireless device. However, in addition to or as an alternative to displaying the purchase options on the mobile device, the purchase option may be communicated to and displayed on a variety of different locations and devices including, but not limited to: the same or another user's home computer via email, web posting or other electronic messaging service, another cellular or mobile computing device of the same or another user, a computing device of another retailer or vendor, or a printer. At this point, the user may determine 311 whether to purchase item immediately at the store where the item was scanned or purchase at lower price on the internet or other location. Also, the user may set a variety of different options to be performed automatically based upon the search results. For example, the user may wish to have a purchase placed automatically if the same item is found at a less expensive price elsewhere. This automatic purchase may be communicated wirelessly through the mobile device to the vendor selling the item or to the vendor's web site for automatic order placement.

Figure 4:
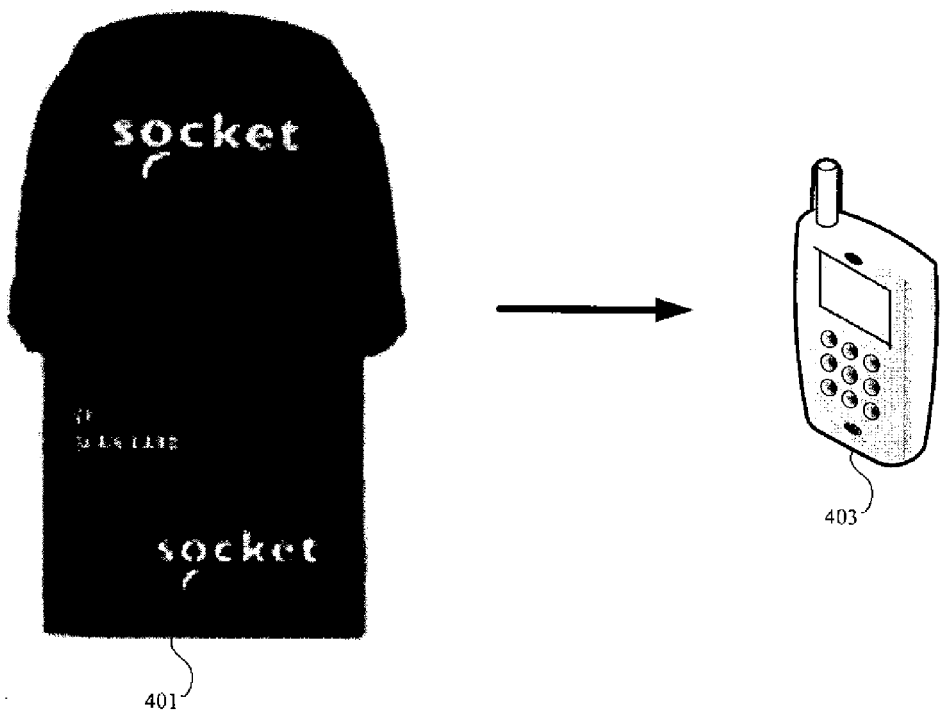
FIG. 4 diagram illustrating scanner suitable for a mobile device and the scanner operably coupled to the mobile device.
Figure 4:
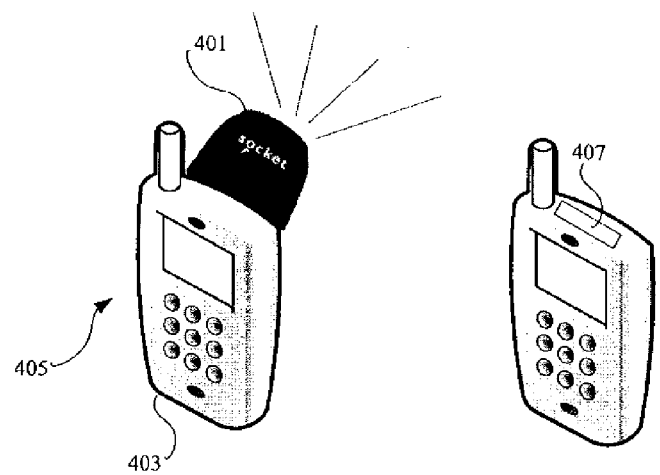

Referring next to FIG. 4, shown is diagram illustrating a scanner suitable for a mobile device and the scanner operably coupled to the mobile device. Shown is a barcode scanner 401 and a mobile communication and computing device 403 and the combination of the scanner 401 operably coupled to the mobile device 403, hereafter referred to as the mobile scanner 405. The barcode reader 401 (or barcode scanner 401) on the mobile scanner 405 is an electronic device for reading printed barcodes. Like a flatbed scanner, it consists of a light source, a lens and a photo conductor translating optical impulses into electrical ones. Additionally, nearly all barcode readers contain decoder circuitry analyzing the barcode's image data provided by the photo conductor and sending the barcode's content to the scanner's output port. Examples of reader types are described below:

Pen Type Readers

Pen type readers consist of a light source and a photodiode that are placed next to each other in the tip of a pen or wand. To read a bar code, the tip of the pen moves across the bars in a steady motion. The photodiode measures the intensity of the light reflected back from the light source and generates a waveform that is used to measure the widths of the bars and spaces in the bar code. Dark bars in the bar code absorb light and white spaces reflect light so that the voltage waveform generated by the photo diode is a representation of the bar and space pattern in the bar code. This waveform is decoded by the scanner in a manner similar to the way Morse code dots and dashes are decoded.

Laser Scanners

Laser scanners work the same way as pen type readers except that they use a laser beam as the light source and typically employ either a reciprocating mirror or a rotating prism to scan the laser beam back and forth across the bar code. As with the pen type reader, a photodiode is used to measure the intensity of the light reflected back from the bar code. In both pen readers and laser scanners, the light emitted by the reader is tuned to a specific frequency and the photodiode is designed to detect only this modulated light of the same frequency.

CCD Readers

CCD readers (also referred to as LED scanner) use an array of hundreds of tiny light sensors lined up in a row in the head of the reader. Each sensor can be thought of as a single photodiode that measures the intensity of the light immediately in front of it. Each individual light sensor in the CCD reader is extremely small and because there are hundreds of sensors lined up in a row, a voltage pattern identical to the pattern in a bar code is generated in the reader by sequentially measuring the voltages across each sensor in the row. The important difference between a CCD reader and a pen or laser scanner is that the CCD reader is measuring emitted ambient light from the bar code whereas pen or laser scanners are measuring reflected light of a specific frequency originating from the scanner itself.

Camera-Based Readers 2D imaging scanners are the fourth and newest type of bar code reader currently available. They use a small video camera to capture an image of a bar code. The reader then uses sophisticated digital image processing techniques to decode the bar code. Video cameras use the same CCD technology as in a CCD bar code reader except that instead of having a single row of sensors, a video camera has hundreds of rows of sensors arranged in a two dimensional array so that they can generate an image.

The particular scanner 402 shown in FIG. 4 as an example is the CompactFlash® Scan Card (CFSC) 5E available from Dell (One Dell Way Round Rock, Tex. 78682). It is a Series 5 Entry Level scanner that adds bar code scanning to a Pocket PC® or Palm® device. Based on miniature linear complementary metal-oxide-semiconductor (CMOS) imaging technology from Symbol Technologies, Inc. (2220 Boston Street Baltimore, Md. 21231 USA) the CFSC 5E scans all popular linear bar code symbologies and uses approximately 57 mA of power during scanning to maximize battery life. SocketScan keyboard emulation software sends decoded data to any Microsoft Windows® or Palm® application as virtual keystrokes. The Manufacturer Part# is IS5024-608 and the Dell Part # is A0488823. However, the scanner 402 for mobile devices shown in FIG. 4 is provided as an example only and other suitable scanning devices may be used including those integrated within a mobile computing device 407 and those using other scanning technologies such as RFID or image capture technologies.

Figure 5:
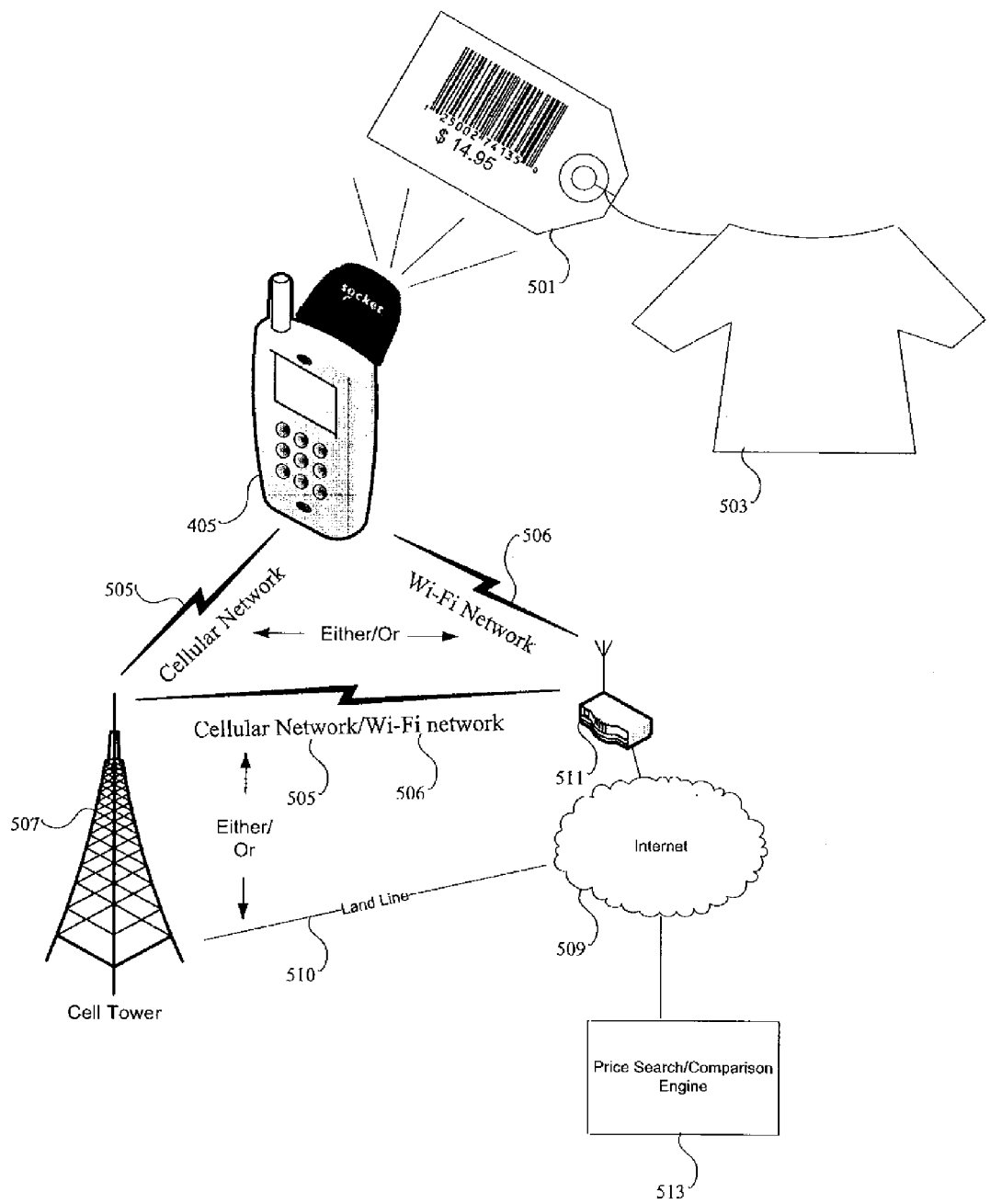
FIG. 5 is a diagram illustrating an example system according to price searching on a mobile device.

Referring next to FIG. 5, shown is a diagram illustrating an example system according to price searching on a mobile device. Shown is the example mobile scanner 4 shown in FIG. 4 scanning the tag 501 of a garment 503, for example. The mobile scanner 405 may be in operable wireless communication with any variety of networks such as the cellular phone network 505 using cellular towers 507 for communication, and/or directly to the internet through Wi-Fi networks 506 and internet router(s) 511. The cellular network 505 may then also interface with other communication networks such as Wi-Fi or land lines 510 to direct the information to the intended destination. Wi-Fi is a wireless technology brand owned by the Wi-Fi Alliance intended to improve the interoperability of wireless local area network products based on the IEEE 802.11 standards. Common applications for Wi-Fi include Internet and VoIP phone access, gaming, and network connectivity for consumer electronics such as televisions, DVD players, and digital cameras. The price and product identification information scanned form the tag 501 may then be communicated over one or more such communication networks to a price search/comparison engine 513 in communication with the Internet 509 or other networks on which product pricing data may be available.

The product price search/comparison engine 513 then searches 307 for same or similar items for sale on the Internet or other network in an automated fashion using the data transmitted from the mobile device. Also using data transmitted from the mobile device, the product price search/comparison engine 513 may also automatically search prices at physical stores posted or published electronically to the Internet or other network using the. The search results and purchasing options are transmitted 309 back to the user's wireless device through the Wi-Fi and/or cellular, and/or other network providing electronic communication.

Figure 6:
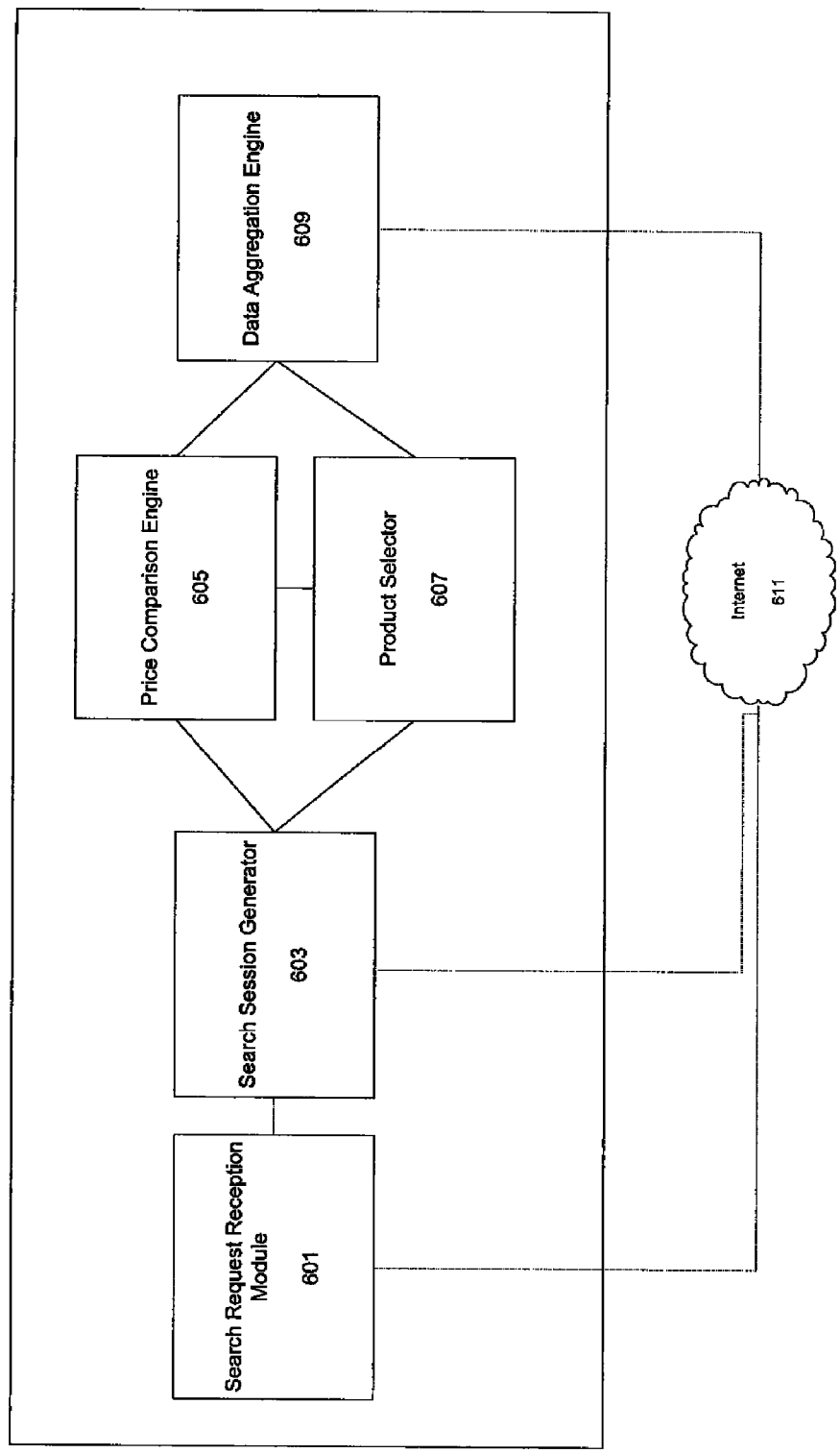
FIG. 6 is a block diagram illustrating an example price search/comparison engine according to the price search/comparison engine of FIG. 5.

Referring next to FIG. 6, shown is a block diagram illustrating an example price search/comparison engine according to the price search/comparison engine of FIG. 5. Shown are the search request reception module 601, the search session generator 603, the price comparison engine 605, the product selector 607, and the data aggregation engine 609. A price search request may be received by the search request reception module 601 from a mobile device 405, for example. The search request reception module may verify the request as having the needed data to perform the search (e.g., price and product identification data), and perhaps reformat the data into a form that may be useful to the price comparison engine 605. For example, if the product identification is a model number, the search request reception module may put the model number in a standard format for understood by the price comparison engine. If the required data is present, the data is passed on to the search session generator 603. The search session generator 603 sets up a search session between the mobile device 405 and the price/search comparison engine 513. This session may be identified by a session number, for example, and may include the network address of the mobile device 405 such that the search results may be communicated to the mobile device 405 when the search results are ready. Other properties of the session may include, but are not limited to: search timeout settings, product type settings, settings for geographic search boundaries, product selection criteria, and current location of the mobile device, for example.

The data aggregation engine 609 is responsible for aggregating price and product information from various sources, may they be interne sites, servers, store inventory databases, etc. Login and/or other authentication credentials, if need be, may be communicated to the data aggregation engine from the mobile device 405, through authorized retailers over the Internet 611, or may be already stored in the data aggregation engine. The data aggregation engine 609 may then use these login and/or authentication credential to access otherwise restricted sites and databases containing price and product information.

The data aggregation engine 609 is in operable communication with the price comparison engine 605 and product selector 607. The price information for the same or similar product identified in the search request is communicated from the data aggregation engine 609 to the price comparison engine 605 and also perhaps to the product selector 607. The price comparison engine 605 determines whether the price is above, below or falls within pre-set range compared to the price of the scanned product 503. The pre-set range may include, for example, a percentage difference (either above, below, or both) from the price of the scanned product 503. The product selector is responsible for selecting a product or number of products communicated from the data aggregation engine 513 that are to be communicated to the mobile device 405 and presented the user. The product selector selects products based upon the price data received from the price comparison engine and certain product selection criteria. The source of the product selection criteria may be from the mobile device 405 or a web server, for example, according to custom settings provided by the user. The product selection criteria may include, for example, to only provide products that are below a certain percent in price difference from the product scanned, or to provide products with prices that are within a range below or above the price of the product scanned, or to only provide products that are any amount in price below the product scanned. Also, product location, source and availability may also be provided along with the price of the available product from the product selector 607 back to the search session generator 603. The search session generator then communicates the products, price and other associated product information back to the mobile device 405 through the Internet 611 and/or over other communications networks (such as the cellular network).

Figure 7:
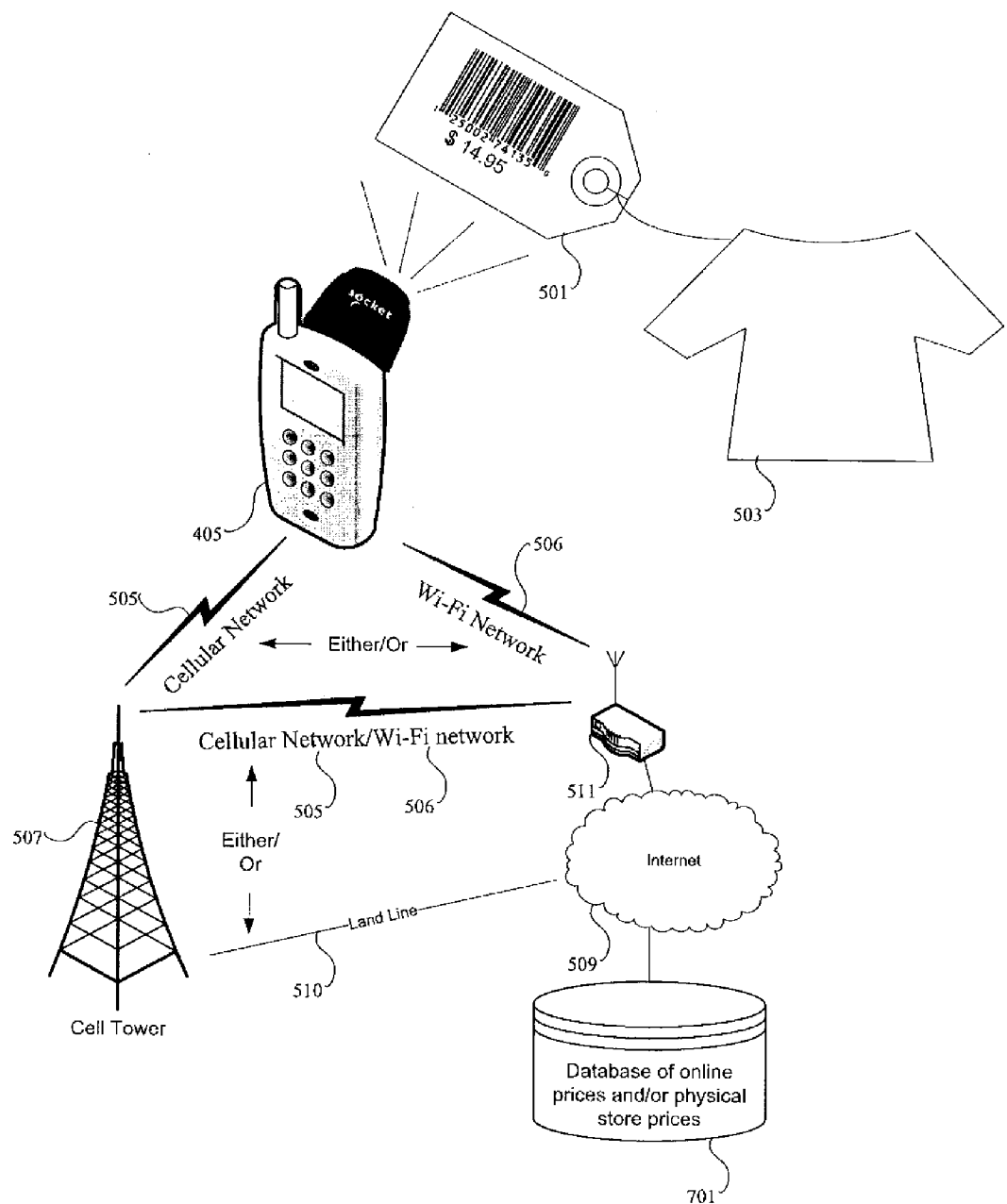
FIG. 7 is a diagram illustrating an alternative embodiment of an example system according to price searching.

Referring next to FIG. 7, shown is a diagram illustrating an alternative embodiment of an example system according to price searching on a mobile device. The system shown in FIG. 7 is similar to that of FIG. 5, except that the product price search/comparison engine 513 of FIG. 5 is not shown. In the system of FIG. 7, all or part of the price search/comparison engine 513 is located within the mobile device 405. Thus, all or part of the searching and comparison functions are performed on the mobile device 405 itself. In the case where all of the searching and comparison functions are performed within the mobile device, the only communication with outside networks required during the price searching and comparison may be to pull the price data from one or more external databases 701 of online prices and/or physical store prices.

Figure 8:
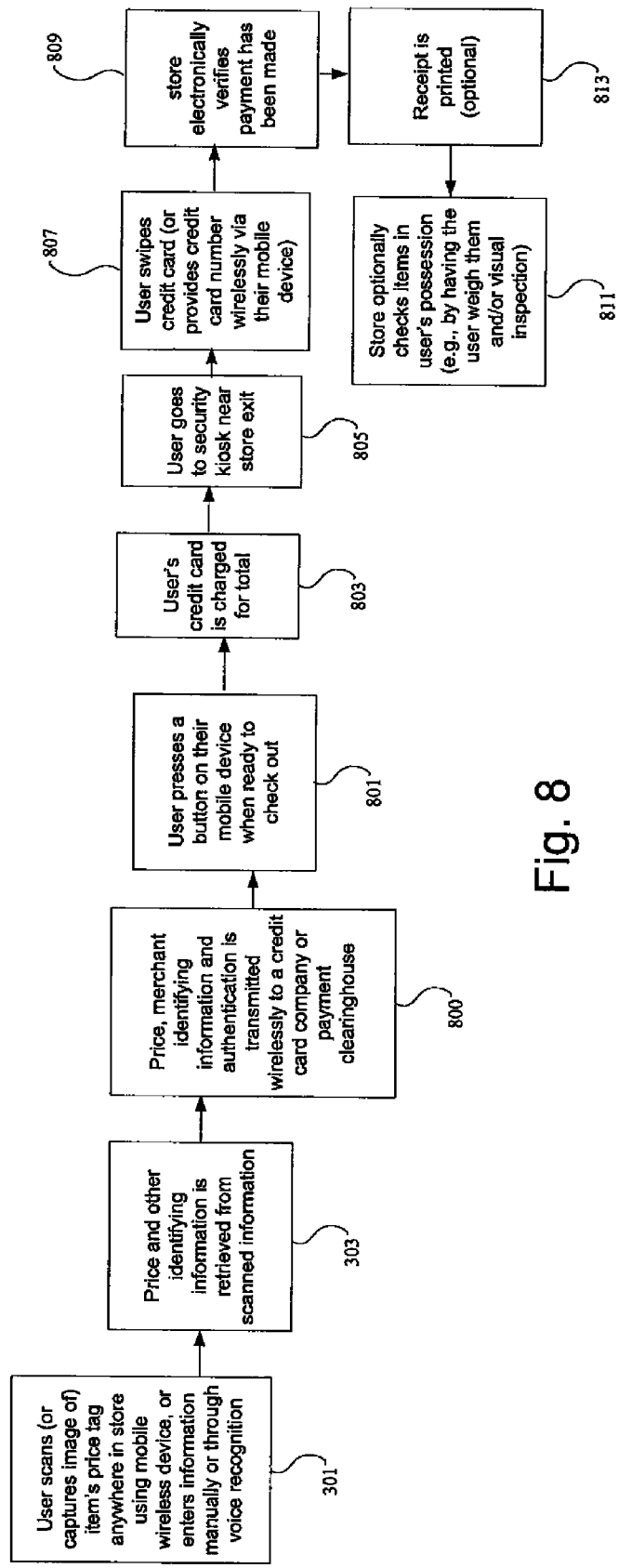
FIG. 8 is a flow chart illustrating an example process according to customer self-checkout using a mobile device.

Referring next to FIG. 8, shown is a flow chart illustrating an example process according to customer self-checkout using a mobile device. Once a user decides to purchase an item in a retail establishment, the user may scan (or capture an image of) 301 an item's price tag while located anywhere in store using their mobile wireless device. The price and possibly other identifying information (including product identifying information and merchant identifying information, for example) is retrieved from the scanned or captured information. If the product identifying information and merchant identifying information are not available on the price tag, then all or part of this information may be input directly by the user into their mobile device, or wirelessly transmitted to the user's wireless device when within a certain proximity to the product or vicinity of the store. For example, when the user walks into the store, there may be a wireless signal sent to their mobile device identifying the merchant code of the store.

The price, merchant identifying information and authentication information of the user and the user's credit card is transmitted 800 wirelessly to a credit card company or payment clearinghouse. For example, the authentication information may include but is not limited to: credit card number, name on credit card, expiration date, card verification value (CVV) or other code on the credit card, user name, password, answer to security question, electronic signature, encryption key, etc. Some or all of this information may be transmitted automatically without the user having to enter it in at the time of purchase. The user may repeat this process for any number of items and then press a button 801 or otherwise indicate on their mobile device when they are ready to check out. At this point, the price and product identification information and merchant code of items scanned since the user entered the store have been stored on the wireless device and/or at the credit card company or other payment clearinghouse. Once the user pushes the button 801 on their mobile device or otherwise indicates that the user wants to check out, a signal is sent to the credit card company or other payment clearinghouse and the user's credit card is charged 803 according to the price information and merchant code stored for the scanned products.

After payment has been made the user may then walk out of the store with the products purchased. However, it may be desirable for the retail establishment to verify that the products the user is leaving with are the same products purchased (if any). Therefore, the user may then proceed 805 to a "security kiosk" near the exit of the store that may be attended by a store personnel and/or equipped with electronic equipment to verify the purchases made. For example, at the security kiosk the user may user may swipe 807 his or her credit card (or provide his or her credit card number wirelessly via their mobile device). The store may then electronically verify 809 payment has been made with the credit card company or other payment clearinghouse. This is accomplished by the store receiving the information identifying the total charge and perhaps also information identifying the products purchased along with the store's unique merchant code and possibly whether the same transaction has already been verified previously. A receipt may then be printed 813 at the kiosk for the user (although this may be optional if the user does not want a receipt or the store's security policy does not require one for the user to leave the store with products in their possession). This is due to that, as described above, a digital signature may be sent from the user's mobile device to the credit card company or payment clearinghouse at the point when the user indicates on his or her mobile device that the he or she wants to proceed to check out. Also, the store may then optionally check 811 items in user's possession. This may be accomplished, for example, by having the user weigh them at a scale located at the security kiosk (as is used in current self-checkout stations), which does not require store personnel, and/or visual inspection by a human against a printed receipt, which would require store personnel.

Figure 9:
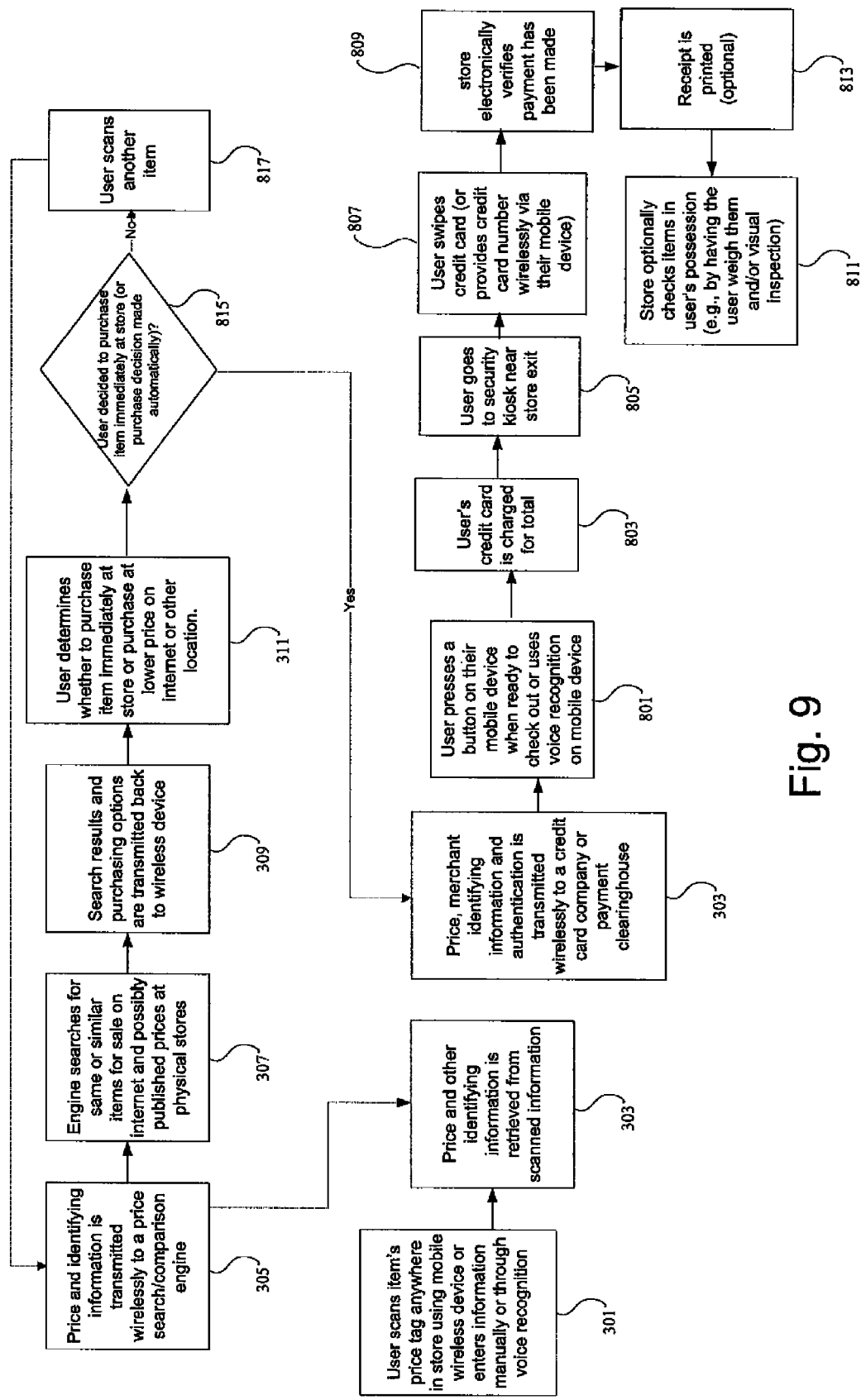
FIG. 9 is a flow chart illustrating an example process according to price searching and customer self-checkout using a mobile device.

Referring next to FIG. 9, shown is a flow chart illustrating an example process according to price searching and customer self-checkout using a mobile device. The price searching and self-checkout aspects described above may be combined into one process for a very convenient shopping experience. For example, as shown in FIG. 9, each time a user scans (blocks 301, 303) an item in the store with their mobile device, there could also be a price search completed (blocks 305, 307, 309, 311) to see if the item is available at a less expensive price somewhere else before the items are added to a list stored within the mobile device of items to be purchased. The user may decide to have items that are not found elsewhere for a less expensive price automatically added 817, 303 to list stored within the mobile device of items to be purchased. Optionally, the user may wish to manually verify 815 on their mobile device all items before they are added to a list stored within the mobile device of items to be purchased. Once the user presses 801 the button on their mobile device to indicate when ready to check out, the process continues as described above (blocks 803, 805, 807, 809, 811, 813).

Figure 10:
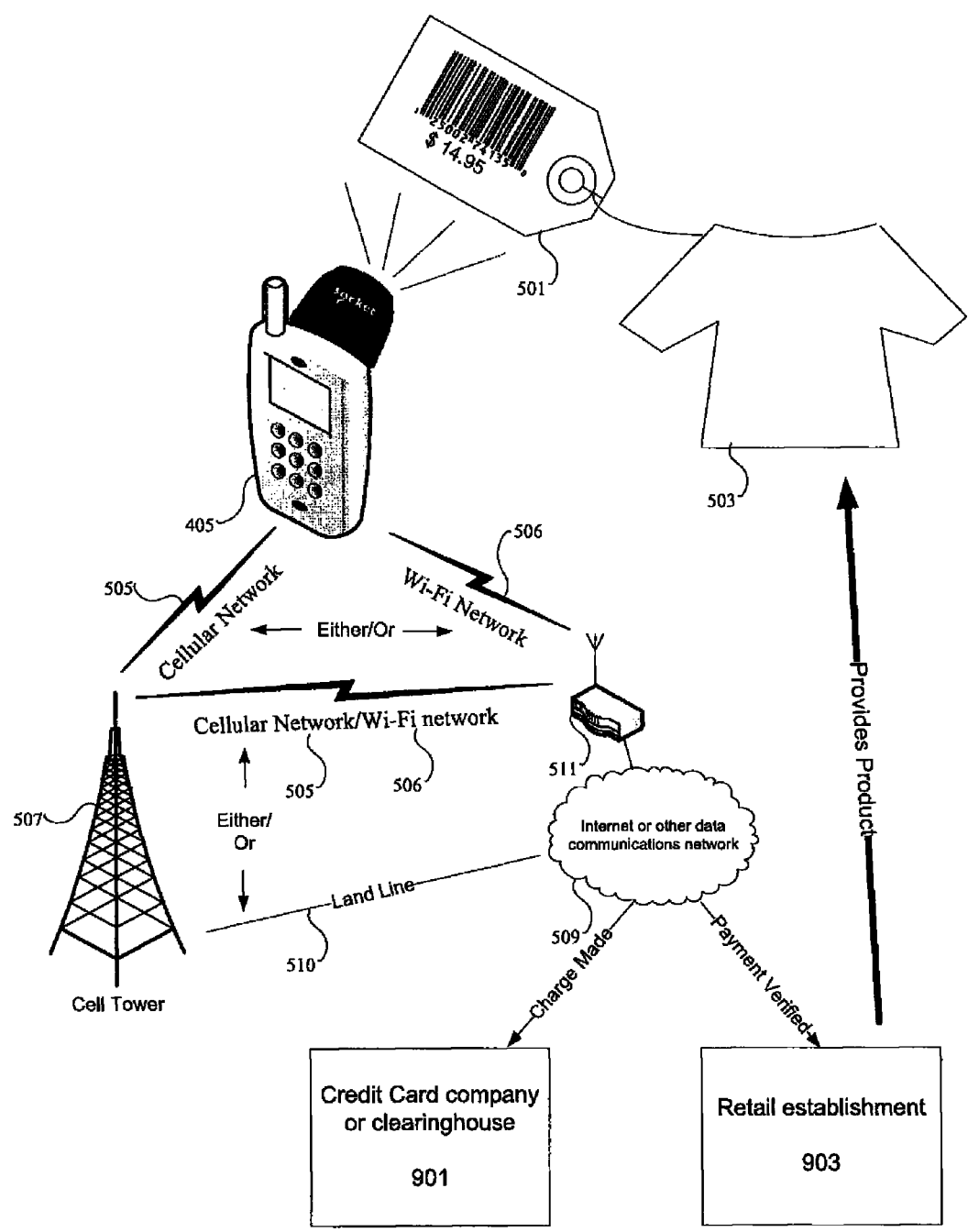
FIG. 10 is a diagram illustrating an example system according to price searching and customer self-checkout using a mobile device.

Referring next to FIG. 10, shown is a diagram illustrating an example system according to price searching and customer self-checkout using a mobile device. The system of FIG. 10, is similar to that of FIG. 5, except that FIG. 10 shows additional components as an example that may be present to implement the self-checkout processes described above with reference to FIGS. 8 and 9. This includes a retail establishment 903 and credit card company or clearinghouse 901, both in operable communication to the user's mobile device 405 via the Internet or other data communications networks 509 through various land lines 510 and/or wireless and cellular networks 505 506. In this way, the appropriate communication channels are present such that a user located within a retail establishment 903 may communicate with their mobile device 405 to the credit card company or payment clearinghouse 901 to send and receive the necessary information to complete the transactions and processes described above and in FIGS. 8 and 9.

Voice recognition technology may be used instead of or in addition to the user to pushing a button on the mobile device to activate a transaction or process as described above. Also, biometric authentication may be used during any authentication process or technology described above. When referencing "credit card" above, this term also includes debit cards, cash cards, gift cards and other types of card used for authentication, account identification and/or to purchase or acquire items.

When referring networks in the above description, this term includes satellite networks among other communication networks. Also, applications performing various tasks can be downloaded to the mobile device as well as the mobile device running as a "thin" client. When referencing computing environments above, this also includes computing devices integrated into computing systems of buses, RVs, trains, motorcycles and other automobiles. The price comparison process includes searching prices at physical stores and the Internet as well as "auction" Internet sites such as eBay. Also, a feature on the mobile device to enter a "preferred" product description (color, size, style, etc.) to help narrow down the product search when product information is not available on the price "tag" may also be included. A user may also place a product on "hold" for a period of time using their mobile device so the user can go to the store to physically inspect the product before finalizing the purchase. A product "tag" as referenced above also may be a chip contained in or on the product.

In addition to or as an alternative to the process described above of weighing of the merchandise to ensure that the products purchased are those leaving the store, the capability of automatically scanning the product security tags (including RFID tags and the like, for example) as the products leave the store may also be present. When confirmation is received regarding the purchase, the mobile device may be used to deactivate the product security tags. As the products leave the store, the product security tags should match what was purchased. If a product's security tag is not matched, store personnel can be notified and/or the product can be automatically charged to the buyer's credit or debit card. The user's mobile device could access (via wireless) the store's application (which can be integrated with the product security tags) to deactivate the product security tag once the transaction (credit or debit card charged) has completed.

As an alternative to the user swiping their card at the security kiosk, the use of smart chips within the card and associated proximity scanning readers may be utilized and/or the mobile device may be used to scan the credit/debit card information. Also, an image of the receipt may be communicated and/or displayed on the mobile device as an option to printing the receipt.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A non-transitory computer-readable medium having computer-executable instructions stored thereon that are executed by a processor to:
   read product identification information from a product in a store with a mobile device, wherein the product identification information includes at least a price of the product in the store;
   compare a price of a product that is the same as the product in the store with the price of the product in the store;
   receive a selection, at the mobile device, to purchase the product in the store;
   verify that the product the customer is leaving the particular store with is the same product for which the customer has been charged; and
   receive a purchase confirmation with the mobile device, wherein the purchase confirmation serves as a receipt for the product in the store.

2. The non-transitory computer-readable medium of claim 1, further comprising computer-executable instructions executed to receive a wireless signal from the store that includes store identification information.

3. The non-transitory computer-readable medium of claim 1, further comprising computer-executable instructions executed to receive a selection to purchase at least one of the product in the store and a product that is the same as the product in the store.

4. The non-transitory computer-readable medium of claim 1, wherein the instructions executed to receive a purchase confirmation include instructions to receive an image of a receipt and display the image of the receipt on the mobile device.

5. The non-transitory computer-readable medium of claim 1, further comprising computer-executable instructions executed to display a product that is the same as the product in the store and is within a predetermined price range of the product in the store.

6. The non-transitory computer-readable medium of claim 1, wherein the instructions executed to receive a selection to purchase at least one of the product in the store and the product that is the same as the product in the store include instructions to purchase a plurality of products.

7. The non-transitory computer-readable medium of claim 1, wherein the instructions executed to compare the price of the product that is the same as the product in the store include instructions to perform price searching on auction sites for the product that is the same as the product in the store.

8. The non-transitory computer-readable medium of claim 1, wherein the instructions executed to compare the price of the product that is the same as the product in the store include instructions to perform price searching in physical stores and on the Internet for the product that is the same as the product in the store.

9. A non-transitory computer-readable medium having computer-executable instructions stored thereon that are executed by a processor to:
scan, with a bar code reader in communication with a mobile device, product identification information from packaging of a product in a store;
send the product identification information, a customer's credit card number, and store identifying information to a payment clearinghouse via the mobile device to purchase the product in the store, wherein the customer is charged for the product in the store according to the product identification information, the customer's credit card number, and the store identifying information;
cause the mobile device to wirelessly communicate with a security kiosk located in the store to verify that the customer has been charged for the product in the store;
receive an image of a receipt as confirmation of the customer being charged for the product in the store; and
display the image of the receipt on the mobile device.

10. The non-transitory computer-readable medium of claim 9, wherein the mobile device wirelessly communicates the customer's credit card number to the security kiosk.

11. The non-transitory computer-readable medium of claim 9, further comprising computer executable instructions executed to cause the mobile device to wirelessly receive the store identifying information from the store.

12. The non-transitory computer-readable medium of claim 9, wherein the instructions executed to cause the mobile device to wirelessly receive the store identifying information from the store include instructions to receive the store identifying information when the customer is in a location proximate to the store.

13. A system, comprising:
a processor;
a memory storing computer-readable instructions for allowing self-checkout within a store, the computer-readable instructions executable by the processor to:
scan, with a bar code reader in communication with a mobile device, product identification information from packaging of a product in a store;
receive a customer's credit card number, product identifying information, and store identifying information via the mobile device to purchase the product in the store, wherein at least the product identifying information is read by the mobile device;
charge the customer's credit card number for thea product according to the product identifying information and store identifying information;
verify that a product the customer is leaving the store with is the same product for which the customer has been charged; and
send a purchase confirmation wirelessly to the mobile device.

14. The system of claim 13, further comprising computer-readable instructions executable to print a receipt for the customer upon verification that the product the customer is leaving the store with is the same product for which the customer has been charged.

15. The system of claim 13, further comprising at least one subsystem that verifies that a weight of the product the customer is leaving the store with is the same weight as the product for which the customer has been charged.

16. The system of claim 13, further comprising:
computer-readable instructions executable to receive the customer's credit card number at a security kiosk wirelessly from the mobile device; and
computer-readable instructions executable to verify that a payment has been made with the credit card to the store.

17. The system of claim 13, further comprising computer-readable instructions executable to use the customer's credit card number to check for individual products bought by the customer from the particular store.

18. The system of claim 13, wherein the computer-readable instructions executable to receive the product identifying information include computer-readable instructions executable to receive a price of the product.

* * * * *